(12) United States Patent
Yeh et al.

(10) Patent No.: US 8,422,883 B2
(45) Date of Patent: Apr. 16, 2013

(54) HEAD-END CIRCUIT AND REMOTE ANTENNA UNIT AND HYBRID WIRED/WIRELESS NETWORK SYSTEM AND TRANSCEIVING METHOD USING THEREOF

(75) Inventors: Chien-Hung Yeh, Zhudong Township, Hsinchu County (TW); Chi-Wai Chow, Fanling (HK); Sien Chi, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 630 days.

(21) Appl. No.: 12/576,304

(22) Filed: Oct. 9, 2009

(65) Prior Publication Data

US 2011/0026932 A1 Feb. 3, 2011

(30) Foreign Application Priority Data

Jul. 29, 2009 (TW) ................................ 98125501 A

(51) Int. Cl.
*H04B 10/00* (2006.01)
*H04J 14/00* (2006.01)
(52) U.S. Cl.
USPC ............................... 398/115; 398/67; 398/72
(58) Field of Classification Search .............. 398/66–68, 398/70–72, 74, 115, 185
See application file for complete search history.

(56) References Cited

U.S. PATENT DOCUMENTS

| | | | |
|---|---|---|---|
| 5,815,295 A * | 9/1998 | Darcie et al. ..................... | 398/72 |
| 6,111,678 A | 8/2000 | Mathoorasing et al. | |
| 6,895,185 B1 * | 5/2005 | Chung et al. ..................... | 398/72 |
| 7,127,176 B2 | 10/2006 | Sasaki | |
| 7,539,419 B2 * | 5/2009 | Sasai et al. ..................... | 398/115 |
| 7,593,648 B2 * | 9/2009 | Raddatz ........................ | 398/195 |
| 7,965,939 B2 * | 6/2011 | Gadkari et al. ................. | 398/67 |
| 2010/0142955 A1 * | 6/2010 | Yu et al. ........................ | 398/72 |

FOREIGN PATENT DOCUMENTS

CN 200710122523.3 A 4/2009

OTHER PUBLICATIONS

Chang, G.K, et al.; "Novel Optical-Wireless Access Network Architecture for Simultaneously Providing Broadband Wireless and Wired Services;" Optical Society of America; 2006; pp. 1-3.
Sarkar, S. et al.; "Optimum Placement of Multiple Optical Network Units (ONUs) in Optical-Wireless Hybrid Access Networks;" Optical Society of America; 2006; pp. 1-3.
Lin, C.T., et al., "Hybrid Optical Access Network Intergrating Fiber-to-the-Home and Radio-Over-Fiber Systems;" IEEE Photonics Technology Letters; vol. 19, No. 8; Apr. 15, 2007; pp. 610-612.
Olmos, J.J.V., et al.; "Dynamic Reconfigurable WDM 60-GHz Millimeter-Waveband Radio-Over-Fiber Access Network: Architectural Considerations and Experiment;" Journal of Lightwave Technology; vol. 25, No. 11; Nov. 2007; pp. 3374-3380.

(Continued)

*Primary Examiner* — Dalzid Singh
(74) *Attorney, Agent, or Firm* — McClure, Qualey & Rodack, LLP

(57) ABSTRACT

A head-end circuit comprises first and second continuous light sources, first and second modulators. The first and the second continuous light sources provide first and second optical signals respectively corresponding to first wavelength and second wavelength, which is different from the first wavelength. The first modulator modulates the first optical signal based on first clock signal to generate an optical clock signal. The second modulator modulates the second optical signal based on downlink data to generate optical downlink data with the carrier of the second optical signal. The optical clock signal and the optical down link data are outputted to a remote antenna unit via first fiber path.

15 Claims, 6 Drawing Sheets

OTHER PUBLICATIONS

Hirata, A., et al.; "Transmission Characteristics of 120-GHz-Band Wireless Link Using Radio-on-Fiber Technologies;" Journal of Lightwave Technology; vol. 26, No. 15; Aug. 1, 2008; pp. 2338-2344.

Jia, Z., et al.; "Key Enabling Technologies for Optical-Wireless Networks: Optical Millimeter-Wave Generation, Wavelength Reuse, and Architecture;" Journal of Lightwave Technology; vol. 25, No. 11; Nov. 2007; pp. 3452-3471.

Sauer, M., et al.; "Radio Over Fiber for Picocellular Network Architectures;" Journal of Lightwave Technolohy; Vo. 25, No. 11; Nov. 2007; pp. 3301-3320.

Ma, J., et al.; "Fiber Dispersion Influence on Transmission of the Optical Millimeter-Waves Generated Using LN-MZM Intensity Modulation;" Journal of Lightwave Technology; vol. 25, No. 11; Nov. 2007; pp. 3244-3256.

Ventouras, S., et al.; "Radio Systems at 60GHz and Above;" Radio Communications Research Unit; Ofcom Contract 410000258; Feb. 2006; pp. 1-194.

C. W. Chow, "IEEE," Wavelength Remodulation Using DPSK Down-and-Upstream With High Extinction Ratio for 10-Gb/s DWDM-Passive Optical Networks; Aug. 21, 2007.

C. W. Chow, "Bidirectional ROF transmission and signal remodulation using separate optical clock distribution to mitigate signal distortions", Optical Fiber Communication—includes post deadline papers, 2009. OFC 2009. Conference on, Mar. 22-26, 2009.

TW Office Action dated Feb. 4, 2013.

English Abstract translation of CN200710122523.3 (Published Apr. 1, 2009).

* cited by examiner

HEAD-END CIRCUIT AND REMOTE ANTENNA UNIT AND HYBRID WIRED/WIRELESS NETWORK SYSTEM AND TRANSCEIVING METHOD USING THEREOF

This application claims the benefit of Taiwan application Serial No. 98125501, filed Jul. 29, 2009, the subject matter of which is incorporated herein by reference.

BACKGROUND

1. Technical Field

The invention relates in general to a wired/wireless network system, and more particularly to a wired/wireless network system capable of performing radio over fiber (RoF) operation.

2. Description of the Related Art

In the present technique, wired fiber network is advantageously with high data transmission bandwidth and is disadvantageously incapable of supporting roaming connection and with low mobility. Wireless network, however, is advantageously capable of supporting roaming connection and with high mobility and is disadvantageously with low data transmission bandwidth and low transmission speed, which is incapable of meeting the demand of multimedia data transmission speed increased with each passing day.

Thus, hybrid wired/wireless network system capable of simultaneously supporting wired and wireless network service has been developed to provide data transmission service with high transmission bandwidth and mobility. Generally speaking, radio over fiber (RoF) and wavelength division multiplexed passive optical network (WDM-PON) are employed in this kind of hybrid wired/wireless network system.

Conventionally, double side band, optical carrier suppression, and single sideband modulation approaches have been used in RoF technique for conveying microwave signals and baseband signals with optical carrier wave, so as to materialize transmissions of optical microwave signals. Fiber paths, however, are generally characterized with fiber dispersion. Therefore, conventional RoF technique employing double sideband modulation approach has the problem of signal fading resulted in low transmission quality in long transmission distance situations; conventional RoF technique employing single sideband modulation approach has the problem of signal time-shifting resulted in low and unstable transmission quality in long transmission distance situations.

SUMMARY

According to a first aspect of the present embodiment, a head-end circuit applied in a hybrid wired/wireless network system is provided. The method includes a first continuous light source, a second continuous light source, a first modulator and a second modulator. The first and the second continuous light sources respectively provide a first optical signal corresponding to a first wavelength and a second optical signal corresponding to a second wavelength, which is different from the first wavelength. The first modulator modulates the first optical signal according to a first clock signal to generate an optical clock signal with the first optical signal as a carrier wave. The second modulator modulates the second optical signal according to downlink data to generate optical downlink data with the second optical signal as a carrier wave. The optical clock signal and the optical downlink data are transmitted to a remote antenna unit (RAU) via a first fiber path.

According to a second aspect of the present embodiment, a remote antenna unit (RAU) applied in a hybrid wired/wireless network system for receiving an optical clock signal and optical downlink data via a first fiber path is provided. The RAU includes a first splitter, a modulator, and a processing circuit. The first splitter splits the optical downlink data into a first part of the optical downlink data and a second part of the optical downlink data. The modulator re-modulates the first part of the optical downlink data according to uplink baseband data to generate and transmit optical uplink data to a head-end circuit. The optical uplink data and the optical downlink data are transmitted via a same optical carrier. The processing circuit receives the second part of the optical downlink data and the optical clock signal and accordingly generating a microwave band electrical signal and a baseband optical signal.

According to a third aspect of the present embodiment, a hybrid wired/wireless network system is provided. The hybrid wired/wireless network system includes a head-end circuit and a RAU. The head-end circuit includes a first receiving circuit, first and second continuous light sources, first and second modulators. The first and the second continuous light sources respectively provide a first optical signal and a second optical signal respectively corresponding to a first wavelength and a second wavelength different from each other. The first modulator modulates the first optical signal according to a first clock signal to generate an optical clock signal with the first optical signal as a carrier wave. The second modulator modulates the second optical signal according to downlink data to generate optical downlink data with the second optical signal as a carrier wave. The RAU includes a first splitter, a third modulator, and a processing circuit. The first splitter splits the optical downlink data into a first part of the optical downlink data and a second part of the optical downlink data. The third modulator re-modulates the first part of the optical downlink data according to uplink baseband data to generate and transmit optical uplink data to the first receiving circuit. The optical uplink data and the optical downlink data are transmitted via a same optical carrier. The processing circuit receives the second part of the optical downlink data and the optical clock signal and accordingly generates a microwave band electrical signal and a baseband optical signal.

According to a fourth aspect of the present embodiment, a data transceiving method applied in a head-end circuit of a hybrid wired/wireless network system for transmitting optical downlink data is provided. The data transceiving method includes the following steps. Firstly, a first continuous light source and a second continuous light source are provided for respectively providing a first optical signal and a second optical signal, which respectively correspond to a first wavelength and a second wavelength different from each other. Next, the first optical signal is modulated according to a first clock signal to generate an optical clock signal with the first optical signal as a carrier wave. Then, the second optical signal is modulated according to downlink data to generate optical downlink data with the second optical signal as a carrier wave. After that, the optical clock signal and the optical downlink data are transmitted to a RAU via a first fiber path.

According to a fifth aspect of the present embodiment, a data transceiving method applied in a RAU of a hybrid wired/wireless network system for receiving optical downlink data is provided. The data transceiving method includes the following steps. Firstly, an optical clock signal and the optical downlink data are received via a first fiber path. Next, the optical downlink data are split into a first part of the optical downlink data and a second part of the optical downlink data. Than, the first part of the optical downlink data are re-modulated according to uplink baseband data to generate optical uplink data. Next, the optical uplink data are transmitted to a head-end circuit via a second fiber path to carry out operations of uplink data transmission, wherein the optical uplink data and the optical downlink data are transmitted on a same optical carrier wave. Next, an intensity modulated second part of the optical downlink data and a first part of the optical clock signal are beaten to obtain an electrical microwave signal. After that, the electrical microwave signal is filtered to obtain and output a microwave band electrical signal and a baseband optical signal, so as to carry out operations of downlink data transmission.

It is to be understood that both the foregoing general description and the following detailed description are exemplary and explanatory only and are not restrictive of the invention, as claimed.

DETAILED DESCRIPTION

The hybrid wired/wireless network system employs independent optical signal for transmission of clock signal.

The hybrid wired/wireless network system according to an embodiment of the invention employs two set of optical signals, which correspond to different wavelengths as carrier waves for the respective transmissions of an optical clock signal and downlink data. Thus, mutual interference between the optical signal conveying baseband signal and that conveying microwave signal can be reduced. Therefore, in comparison to network systems employing the conventional radio over fiber (RoF) technique, the hybrid wired/wireless network system is advantageously capable of reducing signal fading and signal time-shifting taking place in fiber paths and with high transmission quality and stability in long transmission distance situations.

Figure 1:
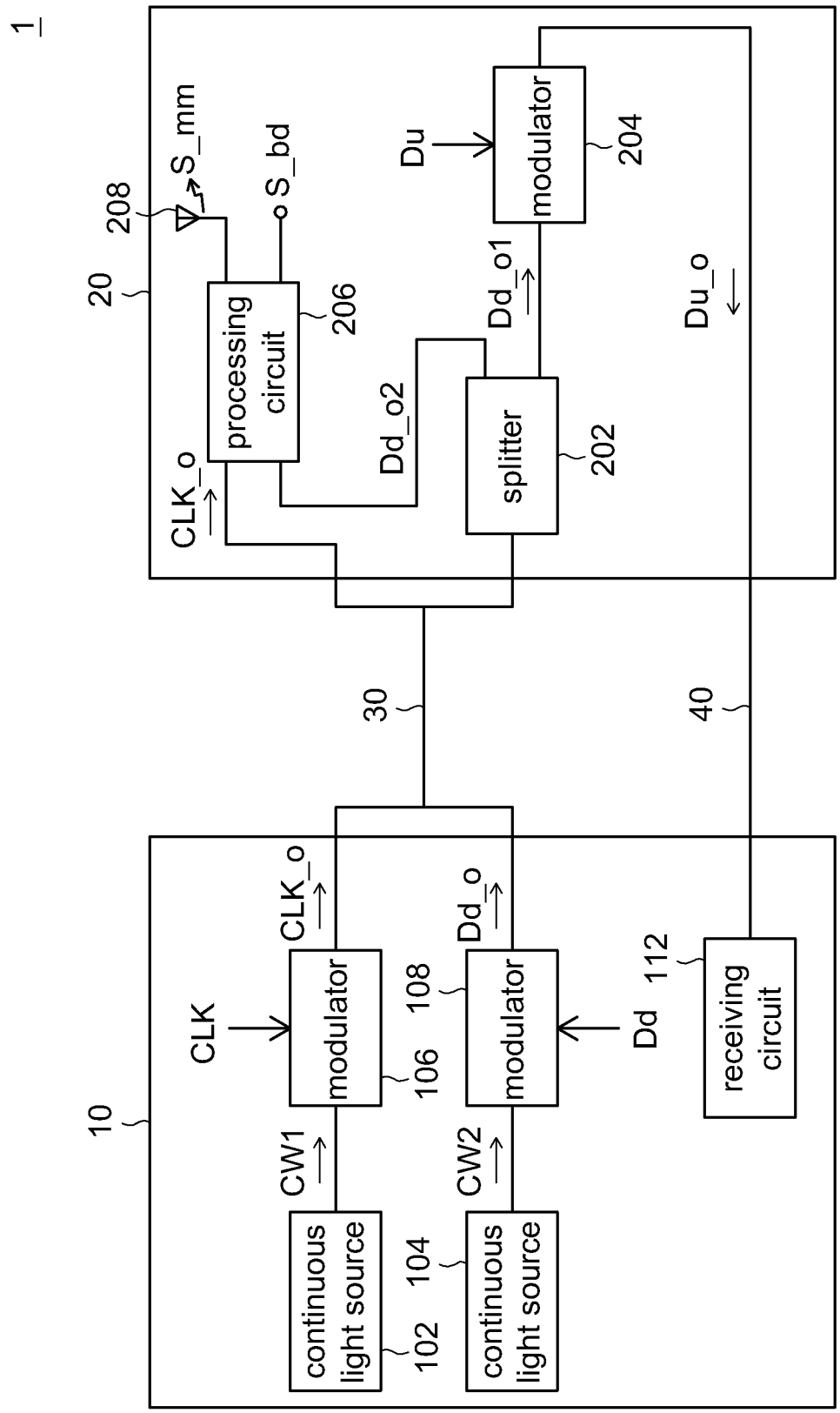
FIG. 1 is a block diagram of the hybrid wired/wireless network system according to an exemplary embodiment consistent with the invention is shown.

Referring to FIG. 1, a block diagram of the hybrid wired/wireless network system according to an exemplary embodiment consistent with the invention is shown. The hybrid wired/wireless network system 1 includes a head-end circuit 10 and a remote antenna unit (RAU) 20, which are connected via fiber paths 30 and 40 for data uplink and data downlink transmissions.

The head-end circuit 10 includes continuous light sources 102 and 104, modulators 106 and 108. The continuous light sources 102 and 104 respectively provide optical signals CW1 and CW2 and the optical signals CW1 and CW2 respectively correspond to first wavelength and second wavelength different from each other. For example, the delta between the first and the second wavelengths are 0.8 nanometers and the delta between the frequency f1 of the first optical signal CW1 and the frequency f2 of the second optical signal CW2 is 100 Gigahertz (GHz).

The modulator 106 modulates the optical signal CW1 according to a clock signal CLK, so as to generate an optical clock signal CLK_o with the optical signal CW1 as the carrier wave. In an example, the modulator 106 is a Mach-Zehnder modulator (MZM), which is driven by the clock signal CLK to generate the optical clock signal CLK_o with a response of double sideband carrier suppressed. The modulator 108 modulates the optical signal CW2 according to downlink data Dd, so as to generate optical downlink data Dd_o with the optical signal CW2 as the carrier wave. For example, the modulator 108 is a phase modulator and the optical downlink data Dd_o are modulated with differential phase shift keying (DPSK) scheme.

Figure 2:
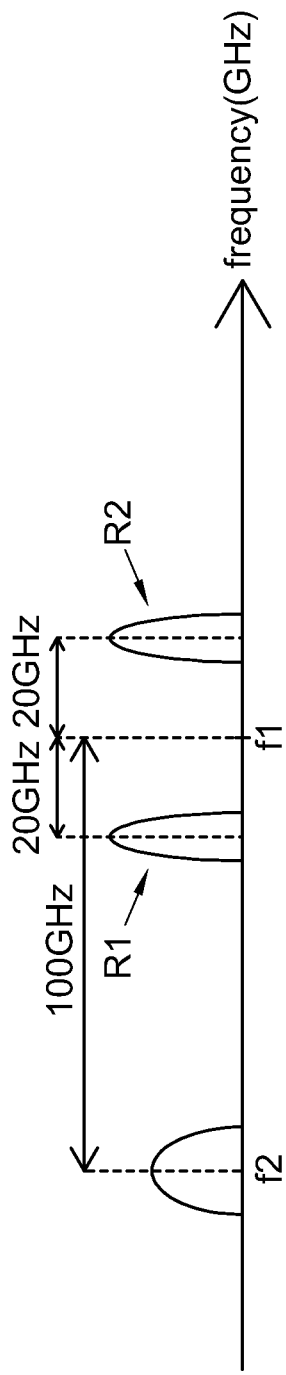
FIG. 2 is an illustration of frequency spectrum of the optical clock signal CLK_o and the optical downlink data Dd_o.

Referring to FIG. 2, an illustration of frequency spectrum of the optical clock signal CLK_o and the optical downlink data Dd_o is presented. For example, the clock signal CLK has a frequency of 20 GHz. The optical clock signal CLK_o has response peaks R1 and R2 respectively corresponding to frequencies (f1+20 GHz) and (f1−20 GHz). The optical downlink data Dd_o has a response peak corresponding to the frequency f2. The delta between the frequencies f2 and f1 is equal to 100 GHz, the carrier frequency f2 and the central frequency (f1−20 GHz) is equal to 80 GHz, and the delta between the carrier frequency f2 and the central frequency (f1+20 GHz) is equal to 120 GHz.

The RAU 20 includes a splitter 202, a modulator 204, and a processing circuit 206. The splitter 202 splits the optical downlink data Dd_o into first part of the optical downlink data Dd_o1 and second part of the optical downlink data Dd_o2. The modulator 204 re-modulates the first part of the optical downlink data Dd_o2 according to uplink baseband data Du, so as to generate and transmit optical uplink data Du_o to the head-end circuit 10 and carry out the operations of uplink communications. The optical uplink data Du_o and the first part of the optical downlink data Dd_o1 are conveyed on a carrier wave, i.e. the optical signal CW2, with substantially the same frequency. In other words, the optical uplink data Du_o and the optical downlink data Dd_o correspond to the same optical wavelength. For example, the modulator 204 is an intensity modulator.

The processing circuit 206 receives the second part of the optical downlink data Dd_o2 and the optical clock signal CLK_o and generates a microwave band electrical signal S_mm and baseband optical signal S_bd accordingly. The RAU 20, for example, includes an antenna 208 for wirelessly transmitting microwave band electrical signal S_mm to a wireless communication device (not shown), so as to carry out wireless communication operations. The RAU 20, for example, further includes an input/output circuit (not shown) for outputting the baseband optical signal S_bd, so as to carry out wired communication operations with a wired communication device (not shown).

Figure 3:
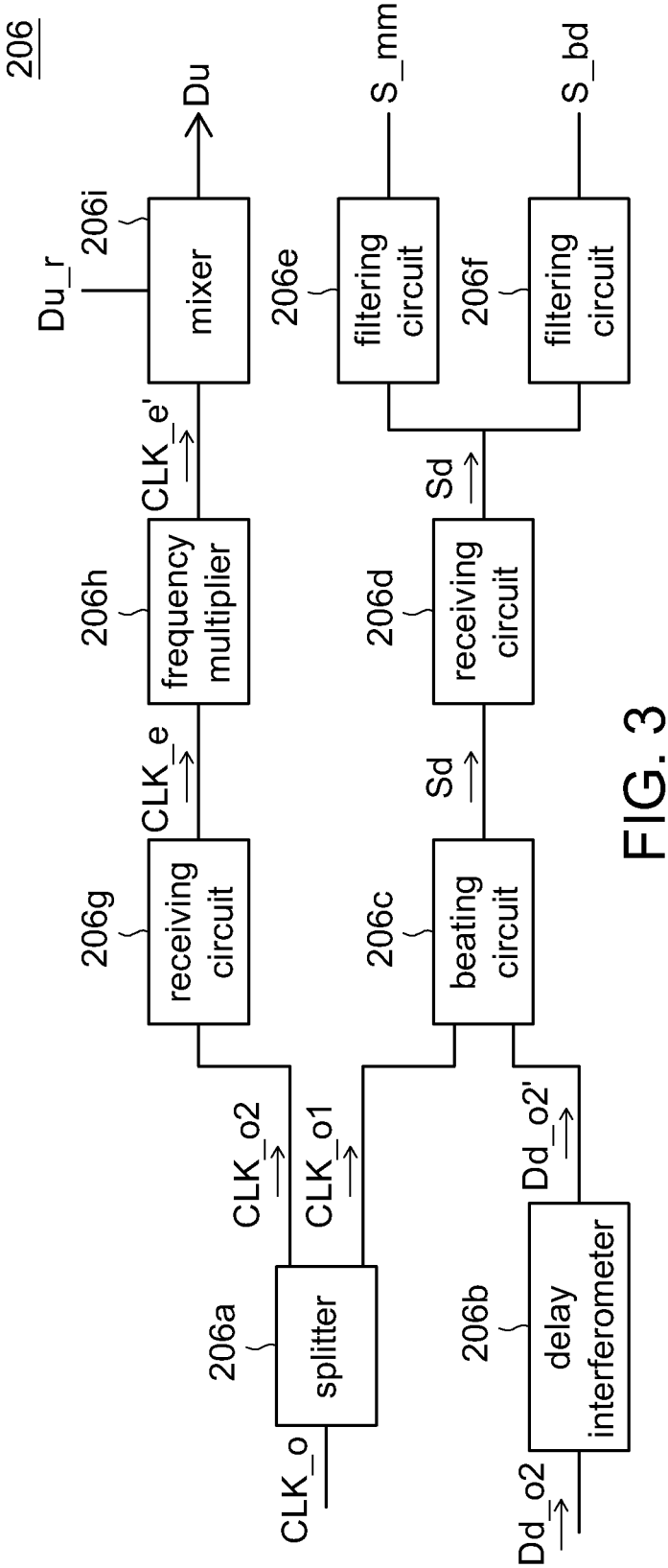
FIG. 3 is a detailed block diagram of the processing circuit 206 shown in FIG. 1.

Referring to FIG. 3, a detailed block diagram of the processing circuit 206 shown in FIG. 1 is presented. The processing circuit 206 includes a splitter 206a, a delay interferometer 206b, a beating circuit 206c, a receiving circuit 206d, and filtering circuits 206e and 206f. The splitter 206a splits the optical clock signal CLK_o into first part of the optical clock signal CLK_o1 and second part of the optical clock signal CLK_o2. For example, the splitter 206a is a passive fiber splitter.

The delay interferometer 206b demodulates the second part of the optical downlink data Dd_o2 to obtain intensity modulated optical downlink data Dd_o2'. The beating circuit 206c beats the intensity modulated optical downlink data Dd_o2' and the first part of the optical clock signal CLK_o1 to generate and transmit an electrical microwave signal Sd to the receiving circuit 206d. For example, the beating circuit 206c generates the electrical microwave signal Sd by beating the response R1 (with the response peak corresponding to frequency (f1−20 GHz)) of the first part of the optical clock signal CLK_o1 and the intensity modulated optical downlink data Dd_o2'.

The filtering circuits 206e and 206f respectively obtain the microwave band electrical signal S_mm and the baseband optical signal S_bd by filtering the electrical microwave signal Sd. For example, the filtering circuit 206e is a bandpass filter with the central frequency of 80 GHz and the bandwidth of 20 GHz for receiving signals within the extremely high frequency band, so as to obtain the microwave band electrical signal S_mm according to the electrical microwave signal Sd. The filtering circuit 206f is a lowpass filter with the 3-dB frequency of 10 GHz obtaining the baseband optical signal S_bd with bit rate of 10 gigabit per second (Gb/s).

The processing circuit 206 further includes a receiving circuit 206g, a frequency multiplier 206h, and a mixer 206i. The receiving circuit 206g for example has a bandwidth of 40 GHz for obtaining an electrical clock signal CLK_e according to the second part of the optical clock signal CLK_o2. For example, the electrical clock signal CLK_e has a frequency of 40 GHz.

The frequency multiplier 206h for multiplying the frequency of the electrical clock signal CLK_e to obtain a frequency-multiplied electrical clock signal CLK_e'. The frequency-multiplied electrical clock signal CLK_e' has, for example, a frequency of 80 GHz. The mixer 206i receives and mixes the frequency-multiplied electrical clock signal CLK_e' and uplink radio frequency data Du_r to obtain the uplink baseband data Du. For example, the uplink radio frequency data Du_r are uplink data provided by the wireless communication device and received via the antenna 208

In an example, the hybrid wired/wireless network system 1 further employs arrayed waveguide grating on the head-end circuit 10 side for carrying out wavelength multiplexing operation on the optical clock signal CLK_o and the optical downlink data Dd_o and providing the wavelength multiplexed signals (including the optical clock signal CLK_o and the optical downlink data Dd_o) to the RAU 20 via the fiber path 30. The hybrid wired/wireless network system 1 further employs another arrayed waveguide grating on the RAU side for de-multiplexing the wavelength multiplexed signal and obtaining the optical clock signal CLK_o and the optical downlink data Dd_o.

Figure 4:
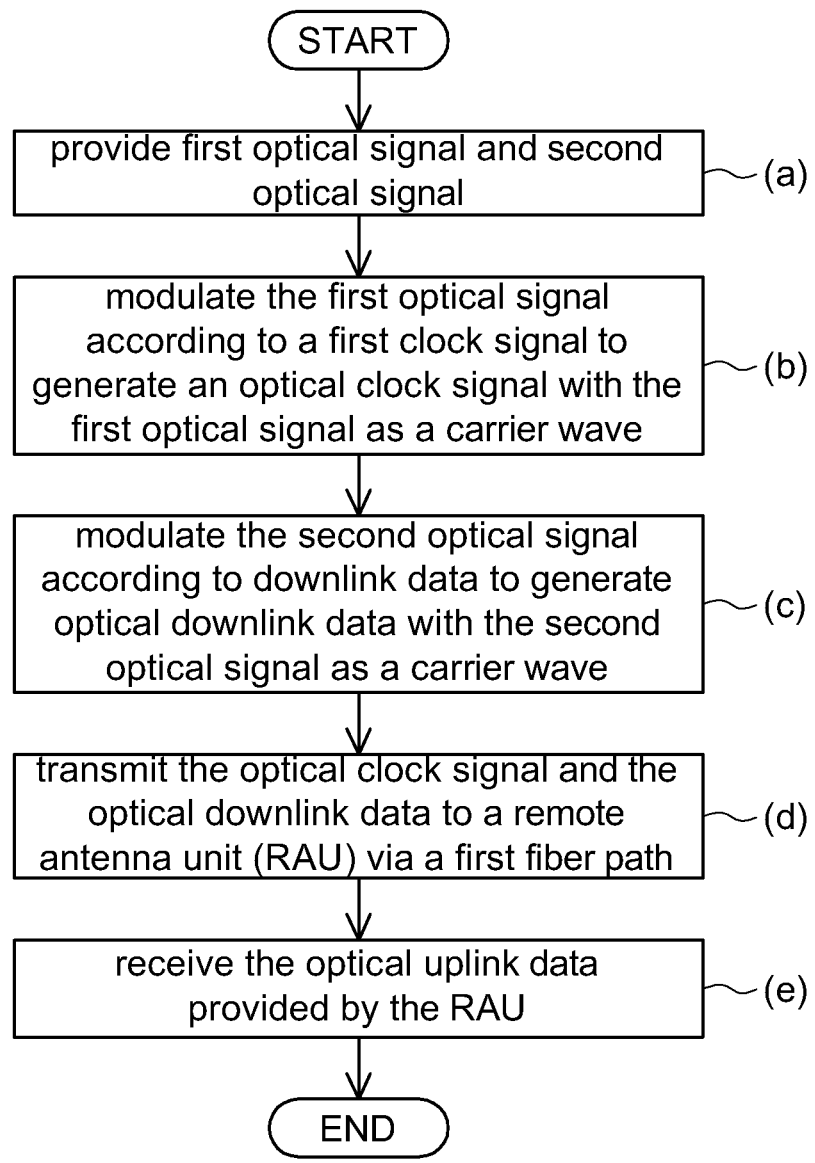
FIG. 4 is a flow chart of the data transceiving method according to the present exemplary embodiment consistent with the invention.
Figure 5A:
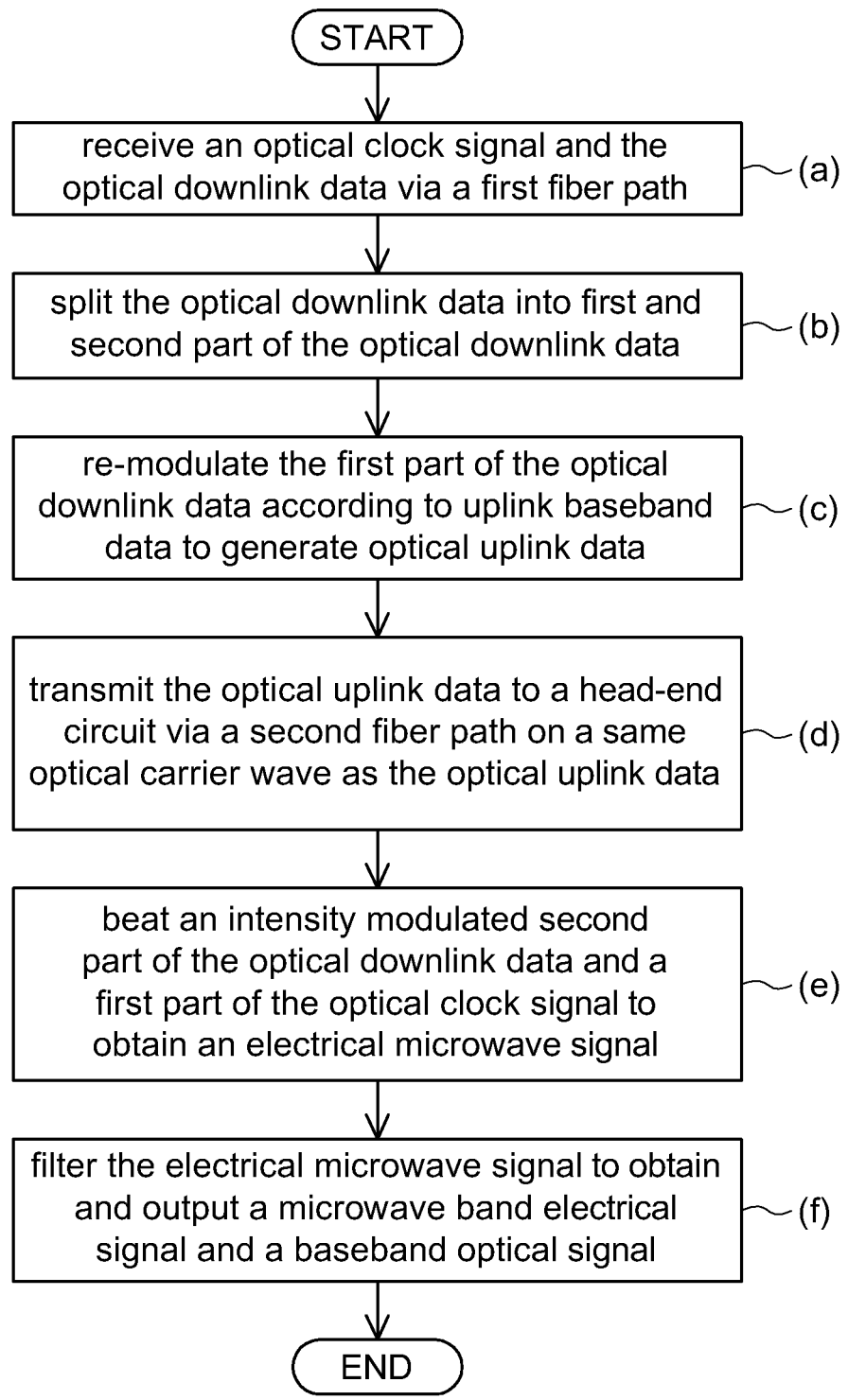
FIGS. 5A-5D is flow charts of the data transceiving method according to the present exemplary embodiment consistent with the invention.
Figure 5B:
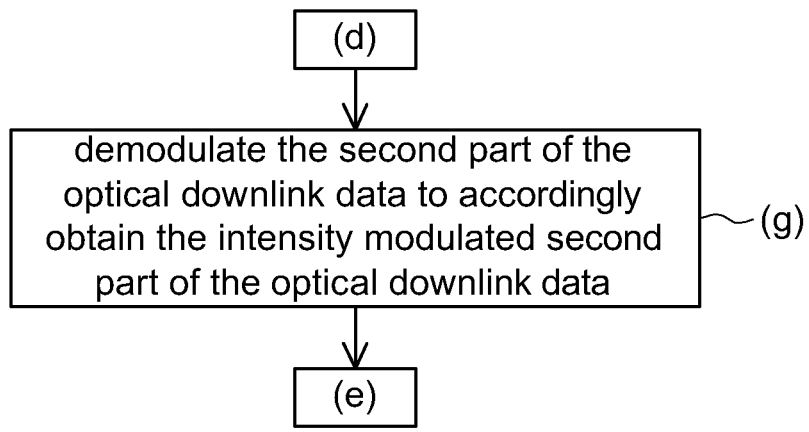
Figure 5C:
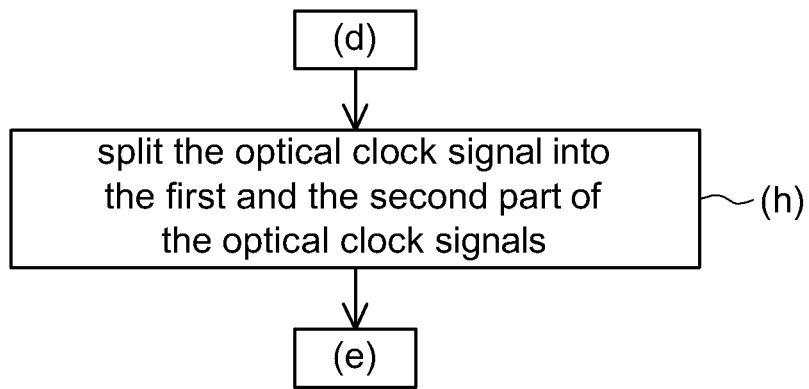
Figure 5D:
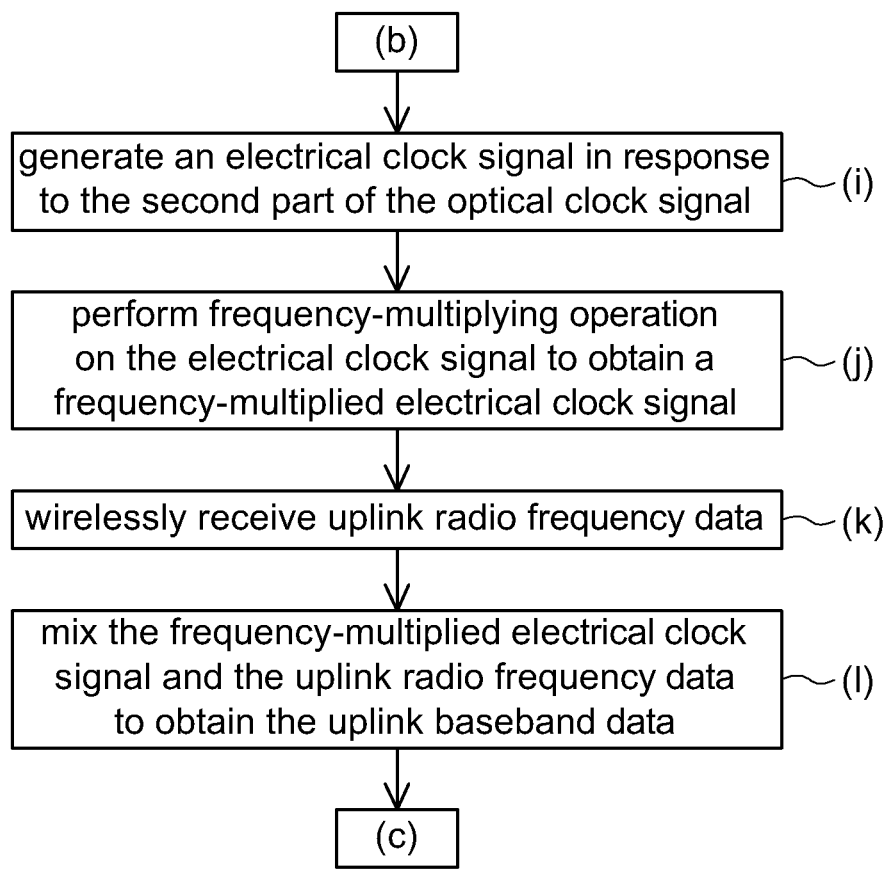

Referring to FIG. 4, a flow chart of the data transceiving method according to the present exemplary embodiment consistent with the invention is shown. The data transceiving method shown in FIG. 4 is applied in the head-end circuit 10 of the hybrid wired/wireless network system 1 for transmitting the optical downlink data Dd_o and receiving optical uplink data Du_o. The data transceiving method includes the following steps. Firstly performing step (a), continuous light sources 102 and 104 are provided for respectively providing the optical signals CW1 and CW2 corresponding to different wavelengths.

Next as step (b), the optical signal CW1 is modulated according to the clock signal CLK to generate the optical clock signal CLK_o with the optical signal CW1 as the carrier wave. The optical clock signal CLK_o has the response of double sideband carrier suppressed with the response peaks R1 and R2. Then as step (c), the optical signal CW2 is modulated according to the downlink data Dd to generate the optical downlink data Dd_o with the optical signal CW2 as the carrier wave. After that performing step (d) that the optical clock signal CLK_o and the optical downlink data Dd_o are outputted to the RAU 20 via the fiber path 30.

In an example, the data transceiving method further includes step (e) that the optical uplink data Du_o provided by the RAU 20 and via the fiber path 40 are received.

Referring to FIGS. 5A-5D, flow charts of the data transceiving method according to the present exemplary embodiment consistent with the invention are shown. The data transceiving method shown in FIGS. 5A-5D are applied in the RAU 20 of the hybrid wired/wireless network system 1 for receiving the optical downlink data Dd_o and transmitting the optical uplink data Du_o. The data transceiving method includes the following steps. Firstly performing step (a), the optical clock signal CLK_o and the optical downlink data Dd_o are received via the optical path 30. Next as step (b), the received optical downlink data Dd_o are split into the first part of the optical downlink data Dd_o1 and the second part of the optical downlink data Dd_o2.

Then as step (c), the first part of the optical downlink data Dd_o1 are re-modulated according to the uplink baseband data Du to generate the optical uplink data Du_o. Next as step (d), the optical uplink data Du_o are transmitted to the head-end circuit 10 via the fiber path 40, so as to carry out operations of uplink data transmission. The optical uplink data Du_o and the optical downlink data Dd_o are transmitted via a same optical carrier wave.

Then as step (e), beating the intensity modulated optical downlink data Dd_o2', which is corresponding to the second part of the optical downlink data Dd_o2, and the first part of the optical clock signal CLK_o1 to obtain the electrical microwave signal Sd. After that performing step (f) that the electrical microwave signal Sd are filtered to obtain the microwave band electrical signal S_mm and the baseband optical signal S_bd.

In an example, the data transceiving method further includes step (g) performed between the steps (d) and (e) for demodulating the second part of the optical downlink data Dd_o2 to accordingly obtain the intensity modulated optical downlink data Dd_o2'.

In other example, the data transceiving method further includes step (h) performed between the steps (d) and (e) for splitting the optical clock signal CLK_o into the first part and the second part of the optical clock signals CLK_o1 and CLK_o2.

In other example, the data transceiving method further includes steps (i)-(l) performed between the steps (b) and (c). As shown in step (i), the electrical clock signal CLK_e is generated according to the second part of the clock signal CLK_o2. Then as shown in step (j), the electrical clock signal CLK_e is frequency multiplied to obtain the frequency multiplied electrical clock signal CLK_e'. Next as shown in step (k), the uplink radio frequency data Du_r are wirelessly received. After that performing step (l) the frequency multiplied electrical clock signal CLK_e' and the uplink radio frequency data Du_r are mixed to generate the uplink baseband data Du.

Although only the example that the clock signal CLK has the frequency of 20 GHz and the different between the frequencies f1 and f2 is 100 GHz is illustrated in the present embodiment of the invention, they are not limited thereto. In other example. The clock signal CLK may also has frequency of 40 GHz, 60 GHz, or 80 GHz.

Although only the example that the modulator 204 is an intensity modulator is illustrated in the present embodiment of the invention, the modulator 204 is not limited thereto and still can be other kind of modulator.

Although only the example that the hybrid wired/wireless network system 1 includes one head-end circuit 10 and one RAU 20 is illustrated in the present embodiment of the invention, more than one head-end circuits and RAUs may also included in the hybrid wired/wireless network system 1 for respectively carrying out operations of uplink data transmission and operations of downlink data transmission via the corresponding fiber paths.

The hybrid wired/wireless network system of the present embodiment employs two set of continuous optical signals with different wavelengths as carrier waves conveying the respective optical clock signal and the downlink data. In other words, an independent continuous light source is employed in the hybrid wired/wireless network system for transmitting the clock signal. Thus, in comparison to the network system employing the convention radio over fiber (RoF) technique, the hybrid wired/wireless network system is advantageously capable of reducing mutual interference between the optical signal conveying the baseband signal and that conveying the microwave signal, reducing signal fading, reducing signal time-shifting taking place in fiber paths and with high transmission quality and stability in long transmission distance situations.

Besides, the RAU in the hybrid wired/wireless network system of the present embodiment applies modulator for modulating the optical downlink data according to the uplink baseband data. In other words, a same optical carrier wave can be used for conveying the downlink data and the uplink data. Thus, the hybrid wired/wireless network system is capable of receiving downlink data from the head-end circuit and transmitting uplink data to the head-end circuit by using RAU with no light source.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A remote antenna unit (RAU) applied in a hybrid wired/wireless network system for receiving an optical clock signal and optical downlink data via a first fiber path, the RAU comprising:
   a first splitter for splitting the optical downlink data into a first part of the optical downlink data and a second part of the optical downlink data;
   a modulator for re-modulating the first part of the optical downlink data according to uplink baseband data to generate and transmit optical uplink data to a head-end circuit, wherein the optical uplink data and the optical downlink data are transmitted via a same optical carrier; and
   a processing circuit for receiving the second part of the optical downlink data and the optical clock signal and accordingly generating a microwave band electrical signal and a baseband optical signal.

2. The RAU according to claim 1, wherein the processing circuit comprises:
   a second splitter for splitting the optical clock signal into a first part of the optical clock signal and a second part of the optical clock signal;
   a first receiving circuit for generating a electrical clock signal in response to the first part of the optical clock signal; and
   a frequency multiplier for multiplying a frequency of the electrical clock signal to obtain a frequency-multiplied electrical clock signal.

3. The RAU according to claim 2, wherein the processing circuit further comprises:
   a mixer for generating the uplink baseband data by mixing the frequency-multiplied electrical clock signal and uplink radio frequency data.

4. The RAU according to claim 2, wherein the processing circuit further comprises:
   a delay interferometer for demodulating the second part of the optical downlink data to generate intensity modulated optical downlink data;
   a beating circuit for beating the intensity modulated optical downlink data and the second part of the optical clock signal to generate an electrical microwave signal;
   a first filtering circuit for filtering the electrical microwave signal to obtain the microwave band electrical signal; and
   a second filtering circuit for filtering the electrical microwave signal to obtain the baseband optical signal.

5. A hybrid wired/wireless network system, comprising:
   a head-end circuit, comprising:
   a first receiving circuit;
   a first continuous light source and a second continuous light source for respectively providing a first optical signal and a second optical signal, which are respectively corresponding to a first wavelength and a second wavelength different from each other;
   a first modulator for modulating the first optical signal according to a first clock signal to generate an optical clock signal with the first optical signal as a carrier wave; and
   a second modulator for modulating the second optical signal according to downlink data to generate optical downlink data with the second optical signal as a carrier wave; and
   a remote antenna unit (RAU) comprising:
   a first splitter for splitting the optical downlink data into a first part of the optical downlink data and a second part of the optical downlink data;
   a third modulator for re-modulating the first part of the optical downlink data according to uplink baseband data to generate and transmit optical uplink data to the first receiving circuit, wherein the optical uplink data and the optical downlink data are transmitted via a same optical carrier; and
   a processing circuit for receiving the second part of the optical downlink data and the optical clock signal and accordingly generating a microwave band electrical signal and a baseband optical signal.

6. The hybrid wired/wireless network system according to claim 5, wherein the processing circuit further comprises:
   a second splitter for splitting the optical clock signal into a first part of the optical clock signal and a second part of the optical clock signal;
   a first receiving circuit for generating a electrical clock signal in response to the first part of the optical clock signal; and
   a frequency multiplier for multiplying a frequency of the electrical clock signal to obtain a frequency-multiplied electrical clock signal.

7. The hybrid wired/wireless network system according to claim 6, wherein the processing circuit further comprises:

a mixer for generating the uplink baseband data by mixing the frequency-multiplied electrical clock signal and uplink radio frequency data.

8. The hybrid wired/wireless network system according to claim 6, wherein the processing circuit further comprises:
   a delay interferometer for demodulating the second part of the optical downlink data to generate intensity modulated optical downlink data;
   a beating circuit for beating the intensity modulated optical downlink data and the second part of the optical clock signal to generate an electrical microwave signal;
   a first filtering circuit for filtering the electrical microwave signal to obtain the microwave band electrical signal; and
   a second filtering circuit for filtering the electrical microwave signal to obtain the baseband optical signal.

9. The hybrid wired/wireless network system according to claim 5, wherein the first modulator is a Mach-Zehnder modulator (MZM).

10. The hybrid wired/wireless network system according to claim 5, wherein the second modulator is a phase modulator and the optical downlink data are modulated with differential phase shift keying (DPSK) scheme.

11. The hybrid wired/wireless network system according to claim 5, wherein the optical clock signal has a response with double sideband carrier suppressed.

12. A data transceiving method applied in a remote antenna unit (RAU) of a hybrid wired/wireless network system for receiving optical downlink data, the data transceiving method comprising:
   receiving an optical clock signal and the optical downlink data via a first fiber path;
   splitting the optical downlink data into a first part of the optical downlink data and a second part of the optical downlink data;
   re-modulating the first part of the optical downlink data according to uplink baseband data to generate optical uplink data;
   transmitting the optical uplink data to a head-end circuit via a second fiber path to carry out operations of uplink data transmission, wherein the optical uplink data and the optical downlink data are transmitted on a same optical carrier wave;
   beating an intensity modulated second part of the optical downlink data and a first part of the optical clock signal to obtain an electrical microwave signal; and
   filtering the electrical microwave signal to obtain and output a microwave band electrical signal and a baseband optical signal, so as to carry out operations of downlink data transmission.

13. The data transceiving method according to claim 12, further comprising:
   demodulating the second part of the optical downlink data to accordingly obtain the intensity modulated second part of the optical downlink data.

14. The data transceiving method according to claim 12, further comprising:
   splitting the optical clock signal into the first part of the optical clock signal and a second part of the optical clock signal.

15. The data transceiving method according to claim 14, further comprising:
   generating an electrical clock signal in response to the second part of the optical clock signal;
   performing frequency-multiplying operation on the electrical clock signal to obtain a frequency-multiplied electrical clock signal;
   wirelessly receiving uplink radio frequency data; and
   mixing the frequency-multiplied electrical clock signal and the uplink radio frequency data to obtain the uplink baseband data.

* * * * *